United States Patent [19]

Woollenweber

[11] 4,169,354
[45] Oct. 2, 1979

[54] EXHAUST GAS AND TURBINE COMPRESSOR SYSTEM

[75] Inventor: William E. Woollenweber, Columbus, Ind.

[73] Assignee: Cummins Engine Company, Inc., Columbus, Ind.

[21] Appl. No.: 754,716

[22] Filed: Dec. 27, 1976

[51] Int. Cl.² ............................................. F02B 37/08
[52] U.S. Cl. ......................................... 60/600; 60/605
[58] Field of Search ..................... 60/39.07, 597, 598, 60/600, 601, 602, 603, 605; 417/380; 302/17

[56] References Cited

U.S. PATENT DOCUMENTS

| | | | |
|---|---|---|---|
| 3,204,859 | 9/1965 | Crooks | 417/380 |
| 3,270,495 | 9/1966 | Connor | 60/602 |
| 3,557,549 | 1/1971 | Webster | 60/602 |
| 3,591,959 | 7/1971 | Kubis | 60/605 |
| 3,614,259 | 10/1971 | Neff | 415/205 |
| 4,008,572 | 2/1977 | Woollenweber | 60/605 |
| 4,009,972 | 3/1977 | Sarle | 417/407 |

Primary Examiner—Louis J. Casaregola
Attorney, Agent, or Firm—Gary M. Gron; Robert T. Ruff

[57] ABSTRACT

The disclosure illustrates an exhaust gas turbine and compressor system for use with a pneumatic conveyor where the exhaust gas is supplied by an internal combustion engine. The engine utilizes a variable geometry turbine device for changing the torque characteristics of the turbine so as to vary the mass flow of air from the compressor driven by the turbine. As a result, the compressor output will be sufficient to supply air to the engine or to the pneumatic conveyor system while the engine is naturally aspirated. A diverter valve is provided for selectively directing air from the outlet of the compressor either to the air intake of the engine or the pneumatic conveyor.

6 Claims, 3 Drawing Figures

U.S. Patent     Oct. 2, 1979     4,169,354
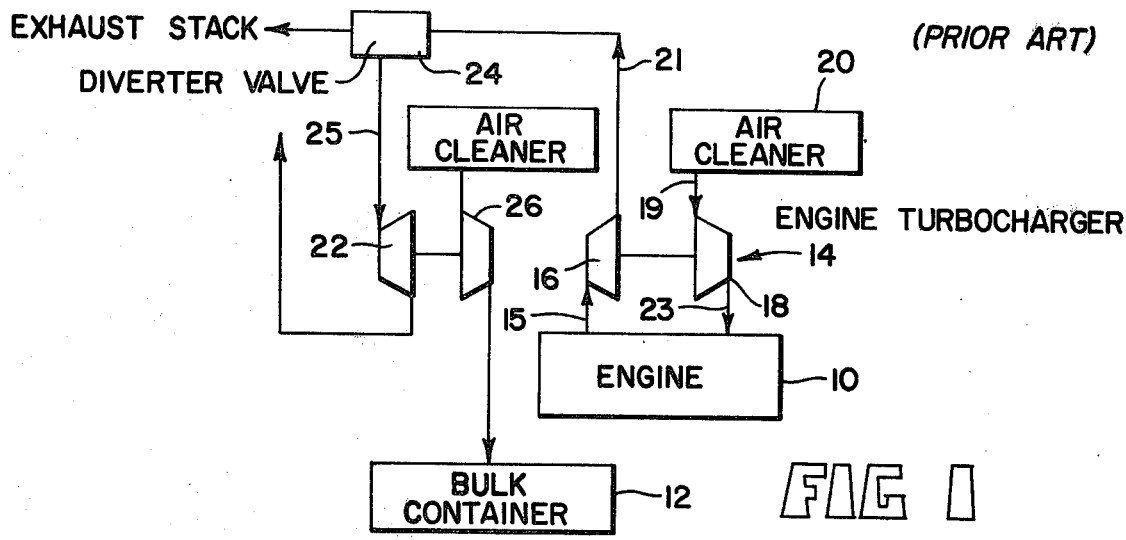
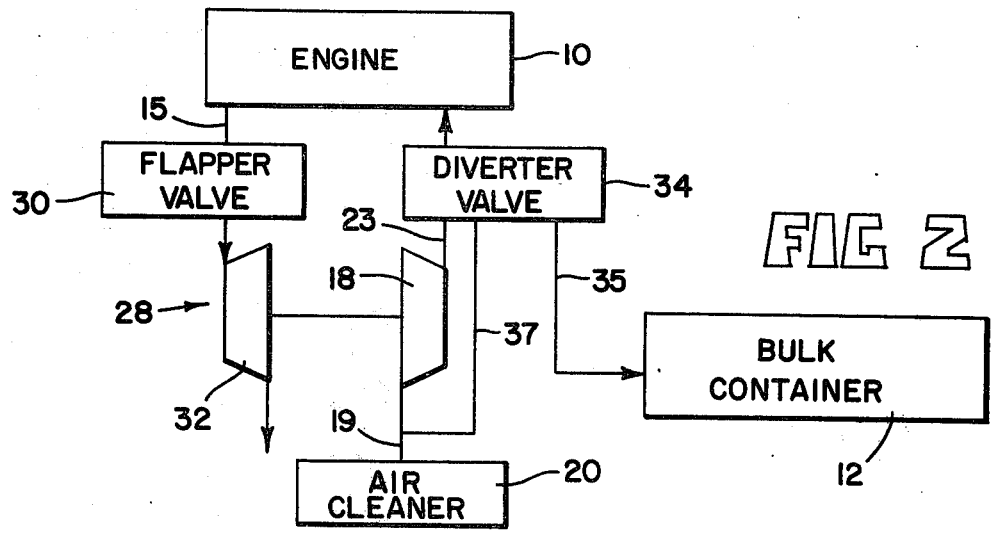
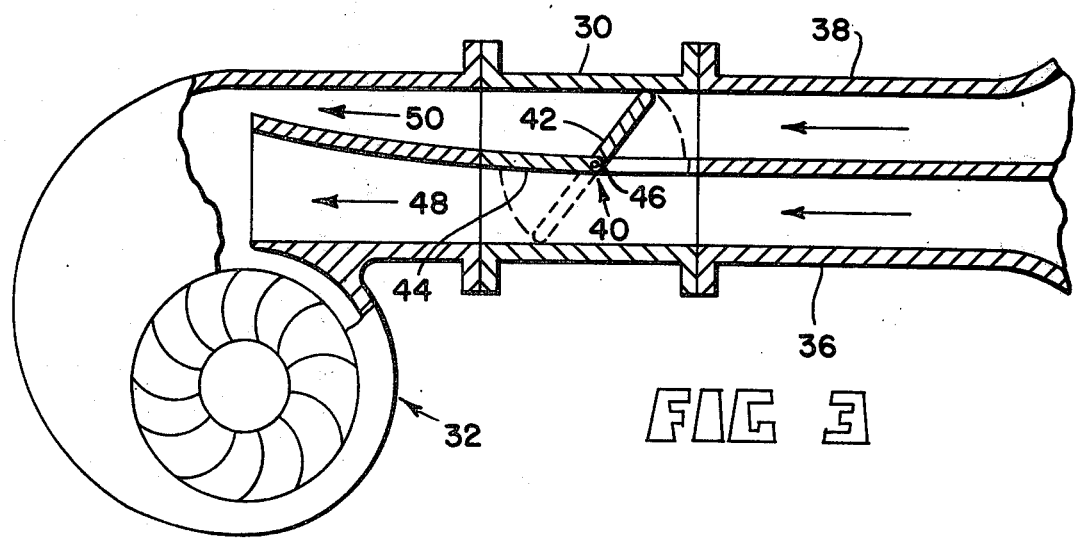

EXHAUST GAS AND TURBINE COMPRESSOR SYSTEM

This invention relates to exhaust gas turbines and compressor systems and more particularly to such a system for use with a pneumatic conveyor where the exhaust gas is supplied by an internal combustion engine.

The trucking industry for many years has had to cope with unloading bulk materials such as cement, grain, liquids, and powder chemicals. One of the earliest methods of providing a transportable bulk material unloading system incorporated a pneumatic conveyor built into the trailer portion of the diesel driven tractor-trailer. A separate gasoline engine mounted on the back of the tractor behind the cab was used to power a compressor to provide the air flow through the pneumatic conveyor system.

This system was superseded by a system that is in common use today. The system also utilizes a pneumatic conveyor built into the trailer but is powered by a turbine mounted on the tractor behind the cab rather than by a separate gasoline engine. The turbine is driven by exhaust gas from the main diesel engine so that the turbine can be used to power the compressor which supplies compressed air to the bulk unloading conveyor system.

There are numerous disadvantages and difficulties associated with the use of these prior art systems, such as, the need for lubricating lines extending from the lubrication system of the main engine to the compressor and/or turbine mounted at the back of the cab. The remote positioning inherently enhances the probability of development of leaks as well as requiring a substantially greater volume of lubricants. In addition, the exhaust gases from the engine must be channeled via exhaust piping to the turbine behind the cab. This causes a substantial heat loss and thus a substantial reduction in energy available to power the turbine.

It is common for diesel engines to have a turbine mounted adjacent the engine and operated by the exhaust gases. This turbine however, is utilized to run the compressor which supercharges the engine and necessarily has different torque characteristics than the turbine which is utilized to drive the compressor for bulk material unloading through a pneumatic conveyor on the trailer. These differences result because the turbine needed to operate the engine compressor must be designed to keep boost pressures within reasonable limits when operating on the exhaust gas flow and temperature produced by the engine at rated load and speed. The turbine needed for use to power the compressor for bulk unloading on the other hand must be designed to operate on the exhaust gas flow and temperature provided by the engine running naturally aspirated at high idle speed. As mentioned above, this difficulty was overcome in prior art devices essentially by providing two different systems of turbines and compressors to operate independently the engine and pneumatic conveyor.

The present invention overcomes the above described disadvantages and difficulties associated with prior art devices by providing a turbine and compressor system in which the same turbine and compressor system is used to supercharge the engine and to provide air flow to a bulk material pneumatic conveyor of the type utilized in tractor-trailer vehicles customarily powered by diesel engines.

In the present system a variable geometry turbine device is supplied with exhaust gas from the engine to drive a compressor. The compressor has suitable outlet diverting valves to permit the compressed air either to be supplied to the engine for supercharging, or to the bulk material pneumatic conveyor for unloading a tractor containing bulk material. In addition, the diverter valve can provide a means for directing air directly from the air cleaner to the engine so that it will be naturally aspirated while the pneumatic conveyor is being operated.

The variable geometry turbine device includes a fixed geometry turbine with means disposed in the inlet duct of the turbine for selectively changing the nozzle area between a first relatively large area to a second relatively small area. At the first area sufficient compressed air can be supplied by the compressor means to operate the engine at full load. The second area enables the compressor to operate the pneumatic conveyor while the engine operates at maximum governed RPM under a no-load condition.

There are many ways to provide the variable geometry turbine device, several of which will be discussed in detail below. One such device is the use of a concentrically aspirated turbine as disclosed in my co-pending patent application Ser. No. 552,861, now U.S. Pat. No. 4,008,572, entitled Turbine Housing incorporated herein by reference. This device utilizes a turbine casing with a first inlet duct connected to a first exhaust manifold branch supplied with exhaust gas from a first set of pistons of the engine and a second inlet duct connected to a second exhaust branch supplied with exhaust gas from a second set of pistons of the engine. Means operatively connected in the first and second inlet ducts of the turbine selectively diverts substantially all the exhaust gas in the first inlet duct into the second inlet duct. In one form the system is designed so that the first and second inlet ducts of the turbine, when combined, have a relatively large area from which sufficient compressed air can be supplied by the compressor means to operate the engine at full load. The second inlet duct of the turbine has a relatively small area enabling the compressor to operate a pneumatic conveying system while the engine operates at maximum governed RPM under a no-load condition when the exhaust gas in the first inlet duct is diverted and combined with the exhaust gas flowing in the second inlet duct.

Particularly in the case of the present invention where the concentric aspirating turbine is utilized, the means for diverting the exhaust gas from the first manifold into the second preferably is a flapper valve which during normal engine operation, is positioned so as to permit exhaust gas to flow through each manifold separately and thus through the first and second ducts separately. The flapper can be manually repositioned to divert all of the exhaust gas from the first inlet duct of the turbine into the second inlet duct while the engine is running at high idle and the pneumatic conveying system is being operated. In addition, in this particular construction, it is preferable to have a dual flapper valve which can be hinged at a center point so that not only the first inlet duct of the turbine can be closed off but also so that the second inlet duct of the turbine can be closed off to provide an exhaust brake which retards rotation of the engine and reduces the speed of a vehicle to reduce wear on its conventional braking system.

In the drawings:

FIG. 1 is a schematic diagram of a prior art device using a separate turbine and compressor system to operate a bulk material pneumatic conveyor;

FIG. 2 is a schematic diagram of the present invention where a single turbine and compressor system is utilized to supercharge the engine and operate the pneumatic conveyor for unloading bulk material;

FIG. 3 is a plan view in partial cross section of a concentric aspirating turbine housing utilized in one embodiment of the present invention.

The prior art device of the type illustrated in FIG. 1 basically comprises a diesel or other internal combustion type of engine 10 which is used to power a tractor-trailer (not shown) of the type commonly used for transporting bulk materials such as chemicals, cement, powders and liquids. The trailer portion of the vehicle contains a large bulk container 12 which houses the material being transported. It is necessary to have some sort of device for unloading the material from the bulk container 12 and a pneumatic conveyor system has proven to be very efficient. Because such vehicles travel to diverse places to deliver their load, it is not feasible to expect that pneumatic conveying equipment will be available everywhere the truck is to unload, and thus, it has been normal to have some type of bulk unloading pneumatic conveyor carried by the vehicle.

In vehicles of this type, it is common to have an engine turbocharger 14 which takes the exhaust gases from the engine via exhaust manifold 15 and passes them across a rotatable turbine 16 which is connected to a compressor 18. Rotation of the compressor 18 receives air from duct 19 extending to cleaner 20 and compresses it for delivery through line 23 to the engine 10. In prior art pneumatic conveying systems exhaust gases in an exhaust pipe 21 leading from turbine 16 are diverted to a second turbine 22 instead of to the atmosphere. This is done through a diverter valve 24 which directs exhaust gases to the engine exhaust stack or to the turbine through pipe 25. The turbine 22 drives a compressor 26 which supplies sufficient air to the pneumatic conveyor to unload the material from the bulk container 12. The pneumatic conveyor system itself (not shown) is of a conventional nature which has a pressurizing effect on the bulk material causing it to be expelled or otherwise removed from the bulk container 12 to unload the same.

The engine turbocharger 14 is mounted directly adjacent the engine 10 in the engine compartment of the cab while the turbine 22 and compressor 26 used for bulk unloading are mounted behind the cab portion of the tractor. The reason for a separate turbine 22 for bulk unloading is that the turbine nozzle area for the engine turbocharger turbine 16 is not small enough to provide sufficient compressor RPM to produce the desired pneumatic conveyor mass flow.

The present invention illustrated in FIG. 2 comprises a variable geometry turbine means 28. In one form the turbine means 28 may include a device such as a flapper valve 30 connected to exhaust manifold 15 for varying the nozzle area of a turbine 32 connected to the compressor 18. A diverter valve 34 is positioned in line 23 to receive the pressurized air output of compressor 18 and direct it along two paths. The first is a continuation of line 23 to engine 10 for normal engine operation. The second is through a line 35 extending to the bulk unloader 12. An additional line 37 extends from duct 19 to the diverter valve 34. When valve 34 directs air to the bulk unloader 12 the duct 19 is connected to line 23 downstream of valve 34 to supply the engine induction system with air directly from the air cleaner.

A preferred form of variable geometry turbine means 28 is the system described in my co-pending application (now U.S. Pat. No. 4,008,572) referred to above and described below with reference to FIG. 3. The variable geometry means 28 comprises a pair of channels 36 and 38 which receive exhaust gases from separate groups of cylinders of an internal combustion engine. A flapper valve 30 is positioned upstream of the turbine 32 and receives gases from channels 36 and 38. The flapper valve 30 comprises a dual butterfly member 40 having separately movable portions 42 and 44 secured for pivotal movement about a central hinge pin 46. The portions 42 and 44 are so shaped as to conform to the cross section of channels 36 and 38 so that they will shut off gas flow in either channel when the appropriate portion is positioned to engage the side wall of the channel. With this construction the portion 42 may be positioned manually or otherwise, as shown in FIG. 3, so that all of the gas flow from channel 38 will be directed into channel 36 and into the inner nozzle 48 of turbine 32. When the portion 42 is disposed in the position shown by dotted lines, the gas flow will be maintained separate through channels 36 and 38 and through the flapper valve 30 into the nozzles 48 and 50. This provides a larger nozzle area than is provided when all of the exhaust gases are diverted into the nozzle 48.

An added feature of the present invention is the use of the butterfly valve 40 with two separately articulated portions 42 and 44. With portion 42 positioned as shown in solid lines in FIG. 3 and portion 44 positioned as shown in dotted lines, all of the exhaust flow from channels 36 and 38 will be stopped thus causing a braking effect on the engine by producing a back pressure on the pistons of the engine during the exhaust stroke.

When the engine 10 is operating to drive a vehicle, the diverter valve 34 is so positioned that air from the air cleaner 20 will pass through the compressor 18 and be provided to the engine induction system. During this time the flapper valve portion 42 will be in the position shown by dotted lines in FIG. 3 and flapper valve portion 44 will be in the position shown by the solid lines in FIG. 3. This will cause the turbine to be operated by a relatively large nozzle area so that the compressor 18 will provide appropriate mass flow to keep the engine boost pressures within reasonable limits. In this operating mode the diverter valve 34 will prevent air from being passed through line 35 to the pneumatic conveyor and all of the air will be channeled into the engine induction system.

During operation of the pneumatic conveyor for unloading the bulk container 12, the engine 10 will be set to run at a high idle. This is when the engine 10 is running at its governed RPM under a no-load condition. The diverter valve 34 would be positioned so that air from the air cleaner 20 via line 37 would pass directly to the engine 10 making it naturally aspirated. The flapper valve portion 42 then would be positioned as illustrated in solid lines in FIG. 3 so that all of the gas flow from passage 38 would be combined with the flow from passage 36 and be diverted through the inner channel of the concentric aspirating turbine. This will cause the turbine 32 to run with a relatively small nozzle area. The small nozzle area causes the gases from the engine 10 to impinge on the turbine wheel of the turbine 32 at a greatly increased velocity. This produces a greater tangential force component on the turbine wheel. The increase force is translated into an increase in torque delivered to the turbine wheel which can drive the compressor 18 at a sufficiently high RPM to produce the necessary air pressure and air flow to operate the pneumatic conveyor for bulk unloading. The compressed air from compressor 18 passes through diverter valve 34 into the pneumatic conveyor system and does not pass to the engine 10 which then runs naturally aspirated, as mentioned above.

The system described above enables a turbocharged internal combustion engine to be used as a bulk unloader with very little extra expense and complexity. Gone is the need for an expensive additional turbine compressor assembly. The variable geometry turbine and diverter valve enable the engine turbocharger to serve a dual function with great effectiveness.

The dual portion flapper valve 42 is particularly useful when the engine is operated to move the vehicle so that an engine braking effect may be utilized without causing excessive pressures on the turbine. These pressures would load the seals and joints of the turbine if such a valve mechanism were placed in the exhaust stack beyond the turbine as is usually the case in conventional systems where an engine turbocharger is utilized.

Although the foregoing provides a description of the preferred embodiment, many variations are possible. All such variations as would be obvious to one skilled in this art are intended to be included in the invention as defined by the following claims.

Having thus described the inventions what is claimed as novel and desired to be secured by Letters Patent of the United States is:

1. A system for selectively supplying compressed air to the intake of an internal combustion engine and to a pneumatic conveying system, said system comprising:
   a rotatable turbine and a turbine housing having inlet means receiving exhaust gases from said internal combustion engine, and nozzle means for directing exhaust gases across said turbine for rotation thereof,
   a compressor connected to and driven by said turbine for pressurizing air,
   means operatively connected in the inlet duct of the turbine for selectively changing the nozzle area between a first relatively large area from which sufficient compressed air can be supplied by the compressor means to operate the engine at full load and a second relatively small area from which sufficient compressed air can be supplied by the compressor means to operate a pneumatic conveying system while the engine operates at high RPM under a no-load condition, and
   valve means for selectively directing air from the compressor to the air intake of said engine in one position and in another position directing air from the compressor to the pneumatic conveying system and simultaneously naturally aspirating the engine.

2. A system as in claim 1 wherein the means for selectively changing the turbine nozzle area includes:
   two inlets in the turbine housing connected to separate exhaust manifold branches of the engine; and
   means for diverting exhaust gas from both of the exhaust manifold branches to one of the inlets.

3. A system as in claim 1 wherein the torque varying means comprises a fixed geometry concentric aspirating turbine housing having a first inlet duct connected to a first exhaust manifold supplied with exhaust gas from a first set of pistons of the engine and a second inlet duct surrounding a portion of said first inlet and connected to a second exhaust manifold supplied with exhaust gas from a second set of pistons of the engine; and
   means positioned in the first and second inlets of the turbine for selectively diverting substantially all the engine exhaust gas to one of said inlet ducts.

4. A system as in claim 3 wherein the combined first and second inlets of the turbine have a relatively large combined nozzle area so that sufficient compressed air can be supplied by the compressor means to operate the engine at full load, and the second inlet duct of the turbine has a relatively small nozzle area so that sufficient compressed air can be supplied by the compressor means to operate the pneumatic conveyor while the engine operates at high speed under a no-load condition and the diverter means is so positioned that all the engine exhaust gas flows only into one of said inlets.

5. A system as in claim 4 further comprising an exhaust gas shut off means disposed in at least a second inlet duct of the turbine for selectively shutting off gas flow from the engine to the turbine to assist in reducing a vehicle's speed by creating a high back pressure on the engine cylinders.

6. A system for selectively supplying compressed air to the intake of an internal combustion engine and to a pneumatic conveying system, said engine having an exhaust manifold, said system comprising:
   a turbine housing having two inlets connected to separate exhaust manifold branches of the engine and having two nozzles each connected to said inlets to receive flow therefrom and direct it across said turbine,
   a rotatable turbine driven by exhaust gases from said internal combustion engine through an inlet duct,
   a compressor connected to and driven by said turbine for pressurizing air,
   means for selectively diverting exhaust gas from both of the exhaust manifold branches to one of the inlets thereby changing the turbine nozzle area between a first relatively large area from which sufficient compressed air can be supplied by the compressor means to operate the engine at full load and a second relatively small area from which sufficient compressed air can be supplied by the compressor means to operate a pneumatic conveying system while the engine operates at high RPM under a no-load condition,
   means for selectively directing air from the compressor to the air intake of said engine or to a pneumatic conveying system, and,
   exhaust gas shut off means disposed in at least the other inlet for selectively shutting off all gas flow from the engine to the turbine to assist in reducing a vehicle's speed by creating a high back pressure on the engine cylinders.

* * * * *